United States Patent [19]
Reid

[11] Patent Number: 6,074,211
[45] Date of Patent: Jun. 13, 2000

[54] EDUCATIONAL DEVICE FOR TEACHING ART

[76] Inventor: Christopher Reid, 167-16 81St Ave., Hillcrest, N.Y. 11432

[21] Appl. No.: 09/263,276
[22] Filed: Mar. 5, 1999
[51] Int. Cl.[7] .................................................. G09B 11/00
[52] U.S. Cl. .................................. 434/81; 434/80; 434/72
[58] Field of Search .................................. 434/72, 75, 79, 434/80, 81, 93; 446/1, 82, 105, 108

[56] References Cited

U.S. PATENT DOCUMENTS

| | | |
|---|---|---|
| 1,273,605 | 7/1918 | Goldman . |
| 1,424,453 | 4/1922 | Farr . |
| 1,451,108 | 4/1923 | Post . |
| 2,059,964 | 11/1936 | Hempstone ................ 434/79 |
| 2,118,338 | 5/1938 | Bolhuis ..................... 434/72 |
| 2,127,047 | 11/1938 | Pinney . |
| 2,200,446 | 5/1940 | Fisher ...................... 434/72 |
| 2,305,567 | 12/1942 | Bole ........................ 434/93 |
| 2,508,925 | 5/1950 | Metz ....................... 434/93 |
| 2,607,972 | 8/1952 | Rust ........................ 434/79 |
| 2,610,413 | 9/1952 | Dasey ................... 434/72 X |
| 2,871,619 | 2/1959 | Walters ............... 434/79 X |
| 2,872,753 | 2/1959 | Fenton ..................... 434/79 |
| 3,392,462 | 7/1968 | Everhart ................... 434/72 |
| 3,491,195 | 1/1970 | Doran ...................... 434/72 |
| 3,603,004 | 9/1971 | Fink ................... 434/80 X |

*Primary Examiner*—Sam Rimell
*Attorney, Agent, or Firm*—Goldstein & Canino

[57] ABSTRACT

A educational device for teaching art including a base member having a generally rectangular configuration. The base member has a planar upper surface and a planar lower surface. The base member has a raised peripheral border disposed around a periphery of the upper surface thereof. The upper surface has a plurality of slots formed therein inwardly of the raised peripheral border and within a central portion thereof. A plurality of wall members extend upwardly from the upper surface of the base member inwardly of the raised peripheral border. Each of the wall members have tabs extending downwardly from lower ends thereof for being received within the slots of the base member. Upper ends of the wall members are secured together by clips. A pair of interior wall members extend inwardly from the wall members. The interior wall members are secured to the plurality of wall members by clips. Each of the plurality of wall members and the interior wall members have a frame disposed on an interior surface thereof for receiving a miniature piece of artwork therein.

5 Claims, 3 Drawing Sheets

Fig. 7
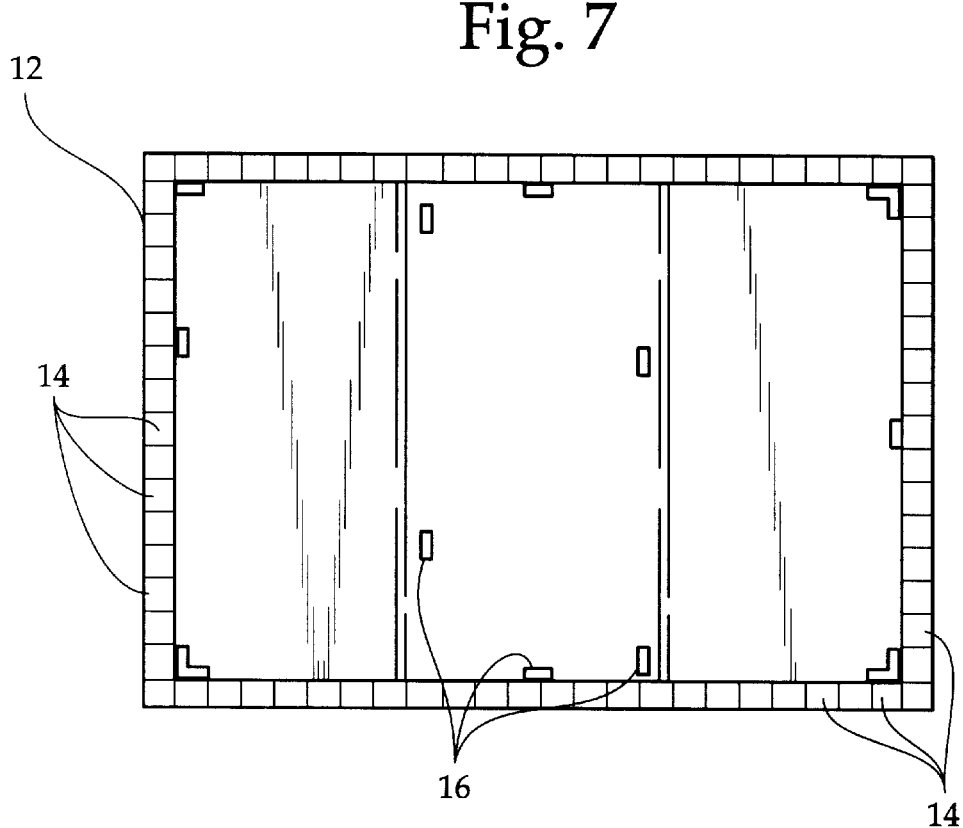
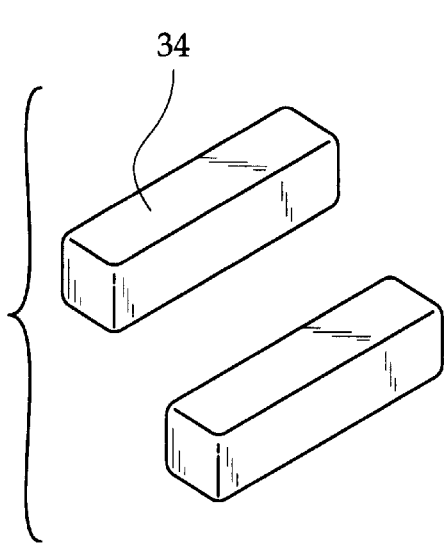
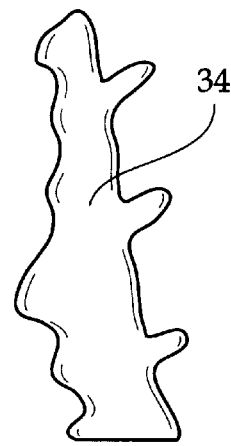
Fig. 8          Fig. 9

EDUCATIONAL DEVICE FOR TEACHING ART

BACKGROUND OF THE INVENTION

The present invention relates to an educational device for teaching art and more particularly pertains to educating children about fine art and art history.

The process of educating children seems to be getting more difficult with the advent of computer games and the like. In order to educate children about things that parents and educators deem important, some form of a game is important. Art and art history are subjects that need to be taught to children in order to expand their minds. However, this subject has been difficult to teach to children without looking at books or traveling to a museum. The former activity will bore the child, the latter is not always an option. The present invention seeks to provide a novel game that will not only teach a child about art and art history, but will also encourage the child to create their own art.

The use of educational games is known in the prior art. More specifically, educational games heretofore devised and utilized for the purpose of educating children are known to consist basically of familiar, expected and obvious structural configurations, notwithstanding the myriad of designs encompassed by the crowded prior art which have been developed for the fulfillment of countless objectives and requirements.

By way of example, U.S. Pat. No. 2,872,753 to Fenton discloses a portable doll house that is capable of collapsing into apiece of luggage. U.S. Pat. No. 2,127,047 to Pinney discloses a miniature demonstration set comprised of a kitchen. U.S. Pat. No. 1,451,108 to Post discloses an educational game comprised of a cross section of a house. U.S. Pat. No. 1,273,605 to Goldman discloses an educational toy comprised of a store window display.

While these devices fulfill their respective, particular objective and requirements, the aforementioned patents do not describe an educational device for teaching art for educating children about fine art and art history.

In this respect, the educational device for teaching art according to the present invention substantially departs from the conventional concepts and designs of the prior art, and in doing so provides an apparatus primarily developed for the purpose of educating children about fine art and art history.

Therefore, it can be appreciated that there exists a continuing need for new and improved educational device for teaching art which can be used for educating children about fine art and art history. In this regard, the present invention substantially fulfills this need.

SUMMARY OF THE INVENTION

In the view of the foregoing disadvantages inherent in the known types of educational games now present in the prior art, the present invention provides an improved educational device for teaching art. As such, the general purpose of the present invention, which will be described subsequently in greater detail, is to provide a new and improved educational device for teaching art and method which has all the advantages of the prior art and none of the disadvantages.

To attain this, the present invention essentially comprises a base member having a generally rectangular configuration. The base member has a planar upper surface and a planar lower surface. The base member has a raised peripheral border disposed around a periphery of the upper surface thereof. The upper surface has a plurality of slots formed therein inwardly of the raised peripheral border and within a central portion thereof. A plurality of wall members extend upwardly from the upper surface of the base member inwardly of the raised peripheral border. Each of the wall members have tabs extending downwardly from lower ends thereof for being received within the slots of the base member. Upper ends of the wall members are secured together by clips. A pair of interior wall members extend inwardly from the wall members. The interior wall members are secured to the plurality of wall members by clips. Each of the plurality of wall members and the interior wall members have a frame disposed on an interior surface thereof for receiving a miniature piece of artwork therein. A plurality of self-standing cars are positionable around the base member. A plurality of self-standing people are positionable on the base member and therearound. A plurality of clay sculptures are positionable on the base member interiorly of the plurality of wall members.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved educational device for teaching art which has all the advantages of the prior art educational games and none of the disadvantages.

It is another object of the present invention to provide a new and improved educational device for teaching art which may be easily and efficiently manufactured and marketed.

It is a further object of the present invention to provide a new and improved educational device for teaching art which is of durable and reliable construction.

An even further object of the present invention is to provide a new and improved educational device for teaching art which is susceptible of a low cost of manufacture with regard to both materials and labor, and which accordingly is then susceptible of low prices of sale to the consuming public, thereby making such an educational device for teaching art economically available to the buying public.

Even still another object of the present invention is to provide a new and improved educational device for teaching art for educating children about fine art and art history.

Lastly, it is an object of the present invention to provide a new and improved educational device for teaching art including a base member having a generally rectangular configuration. The base member has a planar upper surface and a planar lower surface. The base member has a raised peripheral border disposed around a periphery of the upper surface thereof. The upper surface has a plurality of slots formed therein inwardly of the raised peripheral border and within a central portion thereof. A plurality of wall members extend upwardly from the upper surface of the base member inwardly of the raised peripheral border. Each of the wall members have tabs extending downwardly from lower ends thereof for being received within the slots of the base member. Upper ends of the wall members are secured together by clips. A pair of interior wall members extend inwardly from the wall members. The interior wall members are secured to the plurality of wall members by clips. Each of the plurality of wall members and the interior wall members have a frame disposed on an interior surface thereof for receiving a miniature piece of artwork therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a plan view of the floor of the present invention.

FIGS. 8 and 9 are perspective views of clay sculptures of the present invention.

The same reference numerals refer to the same parts through the various figures.

DESCRIPTION OF THE PREFERRED EMBODIMENT

Figure 1:
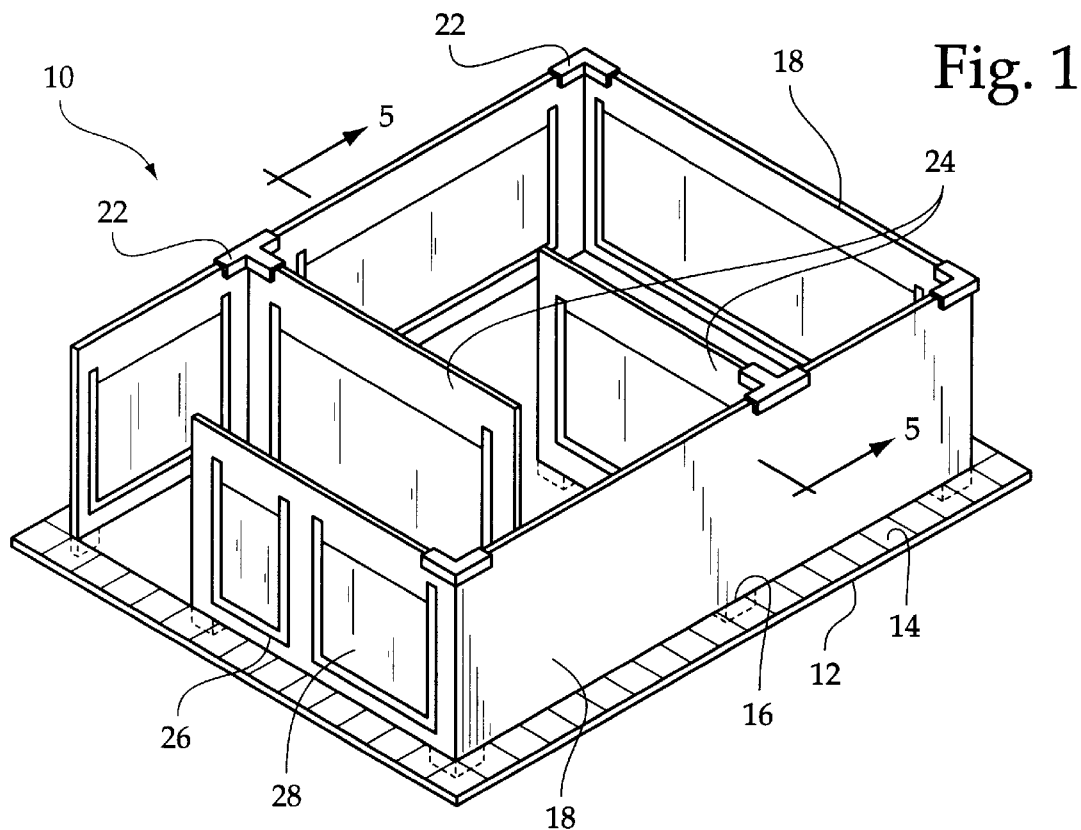
FIG. 1 is a perspective view of the preferred embodiment of the educational device for teaching art constructed in accordance with the principles of the present invention.
Figure 2:
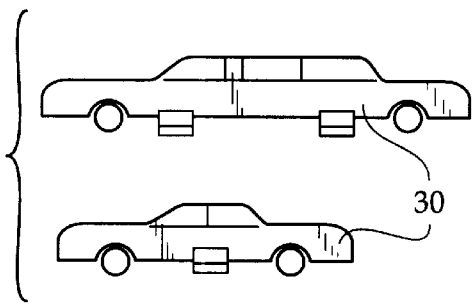
FIG. 2 is a front view of the toy cars of the present invention.
Figure 3:
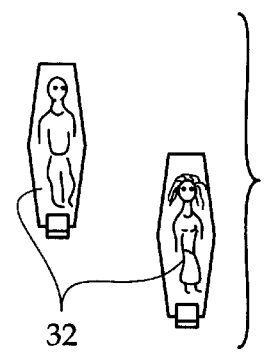
FIG. 3 is front view of the toy people of the present invention.
Figure 4:
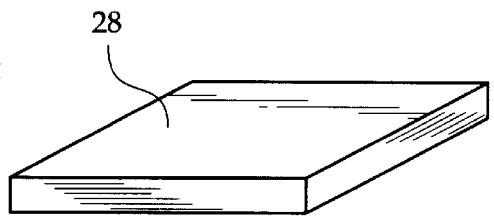
FIG. 4 is a perspective view of a piece of toy art of the present invention.
Figure 5:
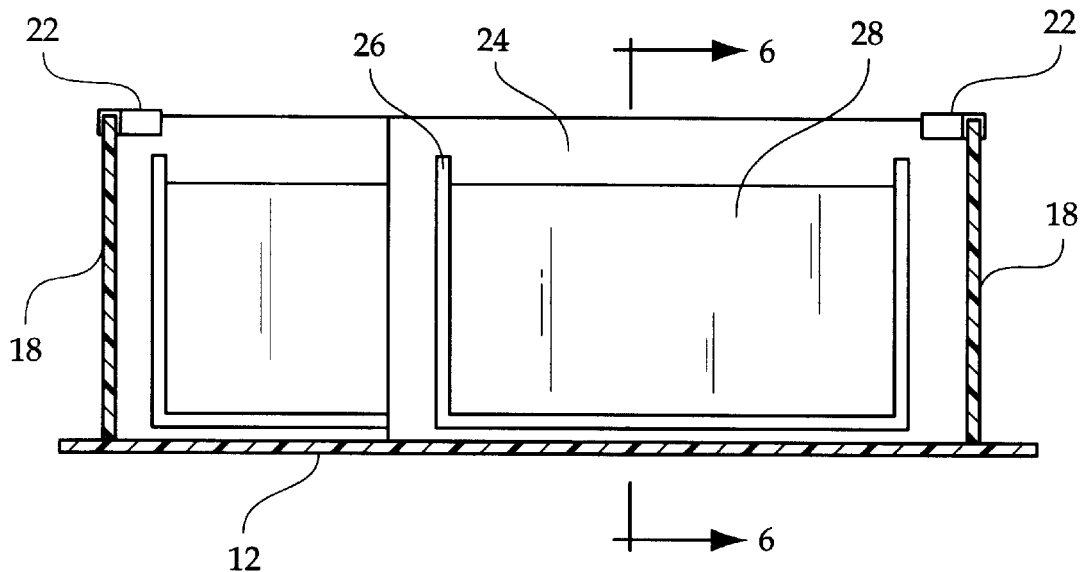
FIG. 5 is a cross-sectional view of the present invention as taken along line 5—5 of FIG. 1.
Figure 6:
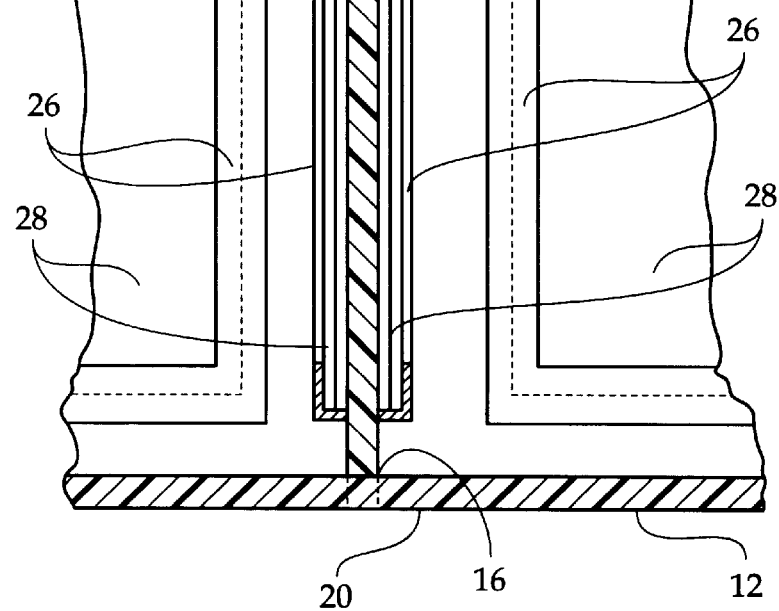
FIG. 6 is a cross-sectional view of the present invention as taken along line 6—6 of FIG. 5.

With reference now to the drawings, and in particular, to FIGS. 1 through 9 thereof, the preferred embodiment of the new and improved educational device for teaching art embodying the principles and concepts of the present invention and generally designated by the reference number 10 will be described.

Specifically, it will be noted in the various Figures that the device relates to a educational device for teaching art for educating children about fine art and art history. In its broadest context, the device consists of a base member, a plurality of wall members, a plurality of self-standing cars, a plurality of self-standing people, and a plurality of clay sculptures. Such components are individually configured and correlated with respect to each other so as to attain the desired objective.

The base member 12 has a generally rectangular configuration. The base member 12 has a planar upper surface and a planar lower surface. The base member 12 has a raised peripheral border 14 disposed around a periphery of the upper surface thereof. The raised peripheral border 14 is defined by individual tiles which can be fabricated in a variety of colors. The upper surface has a plurality of slots 16 formed therein inwardly of the raised peripheral border 14 and within a central portion thereof.

The plurality of wall members 18 extend upwardly from the upper surface of the base member 12 inwardly of the raised peripheral border 14. Each of the wall members 18 have tabs 20 extending downwardly from lower ends thereof for being received within the slots 16 of the base member 12. Upper ends of the wall members 18 are secured together by clips 22. A pair of interior wall members 24 extend inwardly from the wall members 18. The interior wall members 24 are secured to the plurality of wall members 18 by clips 22. Each of the plurality of wall members 18 and the interior wall members 24 have a frame 26 disposed on an interior surface thereof for receiving a miniature piece of artwork 28 therein.

The plurality of self-standing cars 30 are positionable around the base member 12.

The plurality of self-standing people 32 are positionable on the base member 12 and therearound.

The plurality of clay sculptures 34 are positionable on the base member 12 interiorly of the plurality of wall members 18.

The cars 30, people 32, and the sculptures 34 are positioned in and around the base member 12 to add to the realism of the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An educational device for teaching art for educating children about fine art and art history comprising, in combination:

a base member having a generally rectangular configuration, the base member having a planar upper surface and a planar lower surface, the base member having a raised peripheral border disposed around a periphery of the upper surface thereof, the upper surface having a plurality of slots formed therein inwardly of the raised peripheral border and within a central portion thereof;

a plurality of wall members extending upwardly from the upper surface of the base member inwardly of the raised peripheral border, each of the wall members having a tabs extending downwardly from lower ends thereof for being received within the slots of the base member, upper ends of the wall members being secured together by clips, a pair of interior wall members extending inwardly from the wall members, the interior wall members being secured to the plurality of wall members by clips, each of the plurality of wall members and the interior wall members having a frame disposed on an interior surface thereof for receiving a miniature piece of artwork therein;

a plurality of self-standing cars positionable around the base member;

a plurality of self-standing people positionable on the base member and therearound;

a plurality of clay sculptures positionable on the base member interiorly of the plurality of wall members.

2. An educational device for teaching art for educating children about fine art and art history comprising, in combination:

a base member having a generally rectangular configuration, the base member having a planar upper surface and a planar lower surface, the base member having a raised peripheral border disposed around a periphery of the upper surface thereof, the upper surface having a plurality of slots formed therein inwardly of the raised peripheral border and within a central portion thereof;

a plurality of wall members extending upwardly from the upper surface of the base member inwardly of the raised peripheral border, each of the wall members having a tabs extending downwardly from lower ends thereof for being received within the slots of the base member, upper ends of the wall members being secured together by clips, a pair of interior wall members extending inwardly from the wall members, the interior wall members being secured to the plurality of wall members by clips, each of the plurality of wall members and the interior wall members having a frame disposed on an interior surface thereof for receiving a miniature piece of artwork therein.

3. The educational device for teaching art as set forth in claim 2 and further including a plurality of self-standing cars positionable around the base member.

4. The educational device for teaching art as set forth in claim 2 and further including a plurality of self-standing people positionable on the base member and therearound.

5. The educational device for teaching art as set forth in claim 2 and further including a plurality of clay sculptures positionable on the base member interiorly of the plurality of wall members.

\* \* \* \* \*